Nov. 18, 1924.                                                  1,516,478
J. A. SEQUIN
AIR HOSE COUPLING FOR CARS
Filed Nov. 19, 1923                2 Sheets-Sheet 1
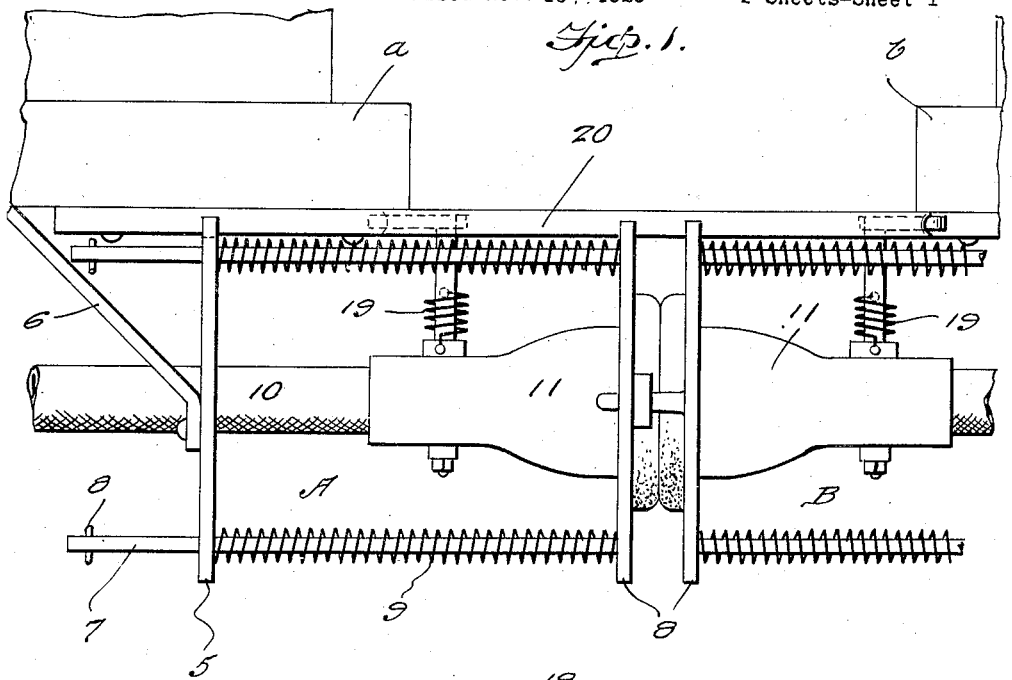
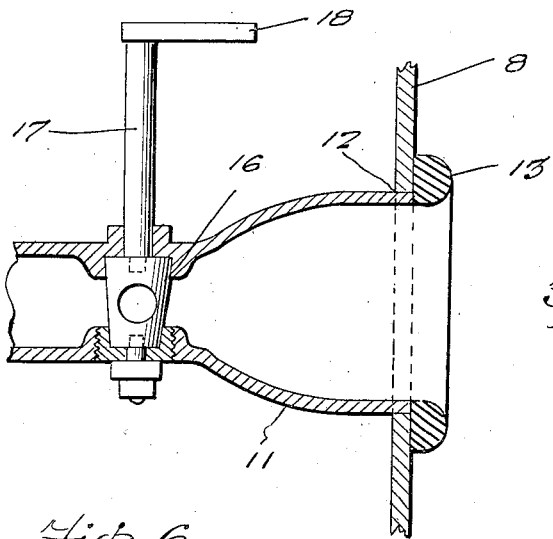
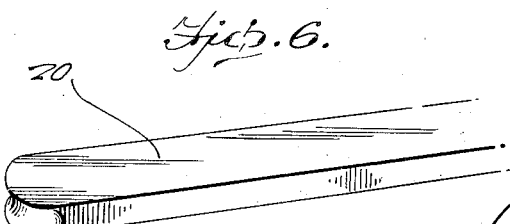
J. A. Sequin
Inventor Nov. 18, 1924.                                                 1,516,478
                       J. A. SEQUIN
                   AIR HOSE COUPLING FOR CARS
                    Filed Nov. 19, 1923        2 Sheets-Sheet 2
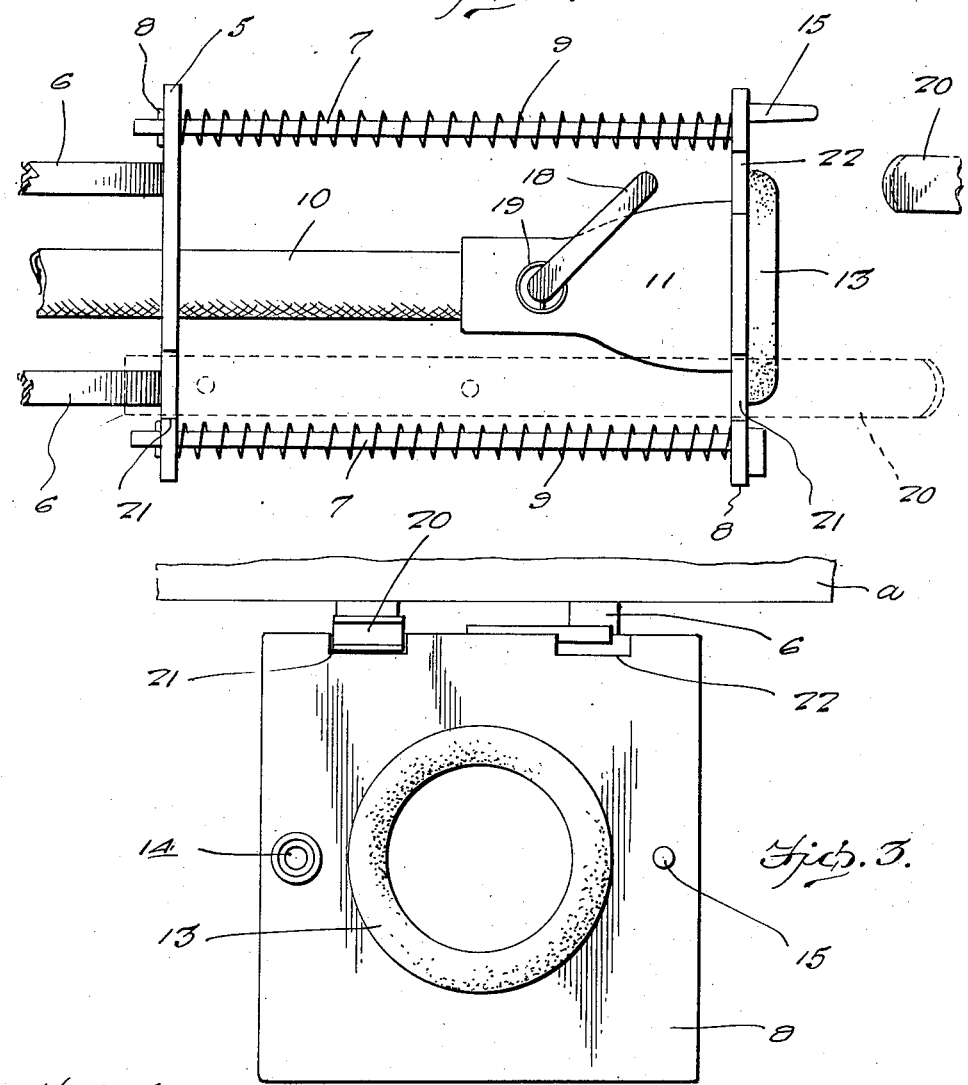
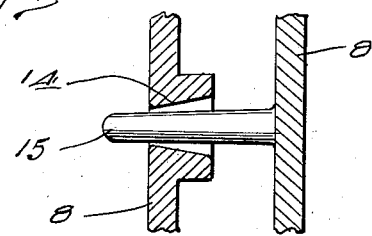

Patented Nov. 18, 1924.

1,516,478

UNITED STATES PATENT OFFICE.

JOSEPHAT A. SEQUIN, OF WINOOSKI, VERMONT.

AIR-HOSE COUPLING FOR CARS.

Application filed November 19, 1923. Serial No. 675,616.

*To all whom it may concern:*

Be it known that I, JOSEPHAT ADONIAS SEQUIN, a citizen of the United States, residing at Winooski, in the county of Chittenden and State of Vermont, have invented certain new and useful Improvements in Air-Hose Couplings for Cars, of which the following is a specification.

In carrying out the present invention it is my purpose to provide an air hose coupling for railway cars wherein the ends of said air hose may be effectively and advantageously coupled together simultaneously with the coupling of the cars and this without requiring the presence of an operator in the coupling or uncoupling operation.

An additional object of the invention resides in the provision of a device of the above character wherein the same may be readily installed upon cars now in use, and this without requiring any great expense, the present coupling being relatively simple of construction and efficient in operation and one that is not liable to become readily out of order.

With the above and other objects in view as the nature of the invention is better understood, the same comprises the novel form, combination and arrangement of parts hereinafter more fully described, shown in the accompanying drawings and claimed.

In the drawings wherein like reference characters indicate corresponding parts throughout the different views, Figure 1 is a fragmentary side elevational view of my improved coupling in operation, Figure 2 is a top plan view of one of the coupling members per se, Figure 3 is a front end elevational view thereof, Figure 4 is an enlarged fragmentary cross sectional view of one of the coupling members for more clearly disclosing one end of the air tube with which one of the members of my improved coupling is associated, Figure 5 is an enlarged fragmentary sectional view taken through a portion of Figure 1 for more clearly disclosing a specific form of guide employed for preventing any lateral displacement of the ends of the air tubes when joined through the medium of the present coupling, and Figure 6 is an enlarged fragmentary perspective of one of the valve trip bars comprising an essential part of the present invention.

Now having particular reference to the drawings wherein there is disclosed an air hose coupling constructed in accordance with the present invention, A and B designate respectively, the members of this present coupling that are positioned upon opposite ends of cars *a* and *b*.

Each of these coupling members includes a stationary relatively square-shaped metallic plate 5 that is suitably anchored to the respective car and this at a point beneath its usual draw bar through the medium of securing arms 6.

These stationary plates 5 are formed adjacent their four corners with openings through which are slidable relatively elongated rods 7 carried by a movable plate 8 of that particular coupling member and be- being also of substantially square-shape, these rods being joined at their front ends to said plate 8 and extending rearwardly through the openings in the stationary plates 5 and being equipped at their free ends with cross pins 8 for preventing the entire disengagement of the rods with respect to the plates 5. For normally forcing the plate 8 forwardly with respect to its complementary plate 5, expansible coiled springs 9 encircle each of the rods as per Figures 1 and 2.

The stationary plate element 5 of each of the coupling members A and B, is formed centrally with a circular opening through which extends the complementary end of the usual air tube 10 carried by the car, the front end of which terminates intermediate the plates 5 and 8 and is equipped with a funnel-shaped nozzle 11 the front end thereof extending through a relatively large circular opening 12 in the movable plate member 8. Positioned upon each of these plates 8 and surrounding the open end of the funnel-shaped nozzle 11 is a ring-shaped rubber cushion 13 for manifestly taking up the greater portion of the jar incident to the coupling of the air pipes for providing a tight fit between the ends thereof.

The movable plates 8—8 of the coupling members A and B are respectively provided with oppositely arranged guide openings 14 and pins 15 for co-operation with each other to prevent any lateral displacement of the plates 8—8 with respect to each other when the air pipes are coupled together.

Each of the funnel-shaped nozzles 11 is provided with a suitable cut-off valve 16 that is provided with an upwardly extending stem 17 upon the upper end of which is a laterally extending arm 18. Surrounding each of said valve stems 17 is a coiled spring 19 that serves as a means for normally maintaining the respective valve closed.

Rigidly secured at one end to each of the cars $a$ and $b$ and extending forwardly considerably further than the respective coupling member is a valve actuating bar 20 these bars being positioned adjacent opposite sides of the different coupling members and extending within alined notches 21 in the upper edges of the plates 5 and 8.

The movable plates 8—8 of the coupling members are formed adjacent their opposite sides and upon their top edges with guide notches 22 through which extends the valve trip rod 20 of the other coupling member.

In view of the above it will at once be seen that as the cars $a$ and $b$ are brought together the funnel-shaped nozzles 11—11 of the air pipes 10—10 will be brought into engagement with each other and so maintained through the medium of the usual car couplings and as these coupling members A and B contact each other the respective bars 20—20 will engage the lateral extensions 18 of the valve stems 17 for consequently opening the valves and allowing a continuous passage of the air through the pipes 10.

Numerous advantages of an air hose coupling of this character will be at once appreciated by those skilled in the art and even though I have herein set forth the most practical embodiment of the invention with which I am at this time familiar it is nevertheless to be understood that minor changes may be made within the invention without departing from the spirit and scope of the appended claim.

Having thus described my invention, what I claim as new and desire to secure by Letters Patent is:—

In an air hose coupling, a pair of coupling heads each comprising a relatively stationary plate, a movable plate carrying pins slidably connected therewith, springs surrounding the pins and interposed between the inner faces of the plates, an air hose line, and coupling heads supported by said plates, a control valve included in said hose line, said valve having a stem on one end of which is an operating handle disposed in a plane with the upper edges of said plate, the upper edges of the plate being provided with notches and a relatively stationary valve handle engaging rod projectible through said notches, and cooperating pin and socket means on the abutting plates of the relative coupling members for preventing relative lateral shifting of said plates.

In testimony whereof I affix my signature.

JOSEPHAT A. SEQUIN.